United States Patent [19]

Iida et al.

[11] 3,862,132
[45] Jan. 21, 1975

[54] OPTICAL RESOLUTION OF DL-2-PYRROLIDONE-5-CARBOXYLIC ACID

[75] Inventors: Masaaki Iida, Yokohama; Hideo Tazuke, Tokyo; Hiroo Kageyama, Kanagawa-ken, all of Japan

[73] Assignee: Ajinomoto Co., Inc., Tokyo, Japan

[22] Filed: Mar. 7, 1972

[21] Appl. No.: 232,501

[30] Foreign Application Priority Data
Mar. 13, 1971  Japan.............................. 46-13531

[52] U.S. Cl...................... 260/326.45, 260/DIG. 8
[51] Int. Cl............................................ C07d 27/72
[58] Field of Search........ 260/326.3, 326.82, 326.45

[56] References Cited
UNITED STATES PATENTS
2,650,938  9/1953  Gero................................. 260/570.6
2,688,018  8/1954  Cosulich.......................... 260/251.5
2,984,684  5/1961  Fike.................................... 260/534
3,381,031  4/1968  Dwyer............................... 260/518

OTHER PUBLICATIONS
Chiddix et al., Chemical Abstract, 68:29593 K, (1968).

Primary Examiner—Donald G. Daus
Assistant Examiner—Ralph D. McCloud
Attorney, Agent, or Firm—Oblon, Fisher, Spivak, McClelland & Maier

[57] ABSTRACT

Lithium DL-2-pyrrolidone-5-carboxylate is optically resolved into its optically active enantiomorphs by contacting a supersaturated solution of lithium DL-2-pyrrolidone-5-carboxylate with crystals of one or both of the optically active enantiomorphs of said lithium DL-2-pyrrolidone-5-carboxylate with the provision that when seed crystals of both enantiomorphs are used simultaneously they are separable from each other on a particle size basis.

2 Claims, No Drawings

OPTICAL RESOLUTION OF DL-2-PYRROLIDONE-5-CARBOXYLIC ACID

The invention relates to a process for the optical resolution of DL-2-pyrrolidone-5-carboxylic acid, and more particularly, to a process for resolving a lithium salt of DL-2-pyrrolidone-5-carboxylic acid into the optically active enantiomorphs thereof.

2-Pyrrolidone-5-carboxylic acid (hereinafter abbreviated as PCA), which is a compound of intramolecular dehydration of glutamic acid, is a useful compound on a view of industry which is used as the same valuable compound as glutamic acid, the resolution reagents in chemical resolving methods and the other synthetic raw materials of pyrrolidone derivatives.

The study with respect to the optical resolution method of PCA has not so carried out, and a process for resolving DL-PCA or the salts thereof into the optically active enantiomorphs thereof have been never known.

We have studied to optically resolve effectively DL-PCA, found that the lithium salt of DL-PCA (hereinafter abbreviated as DL-PCA.Li) to which DL-PCA (racemic compound) has been converted, is a racemic mixture capable of resolution by "seeding process" and can be precipitated from the solution, and completed the present invention.

The present invention gives a process for resolving DL-PCA which comprises converting DL-PCA to DL-PCA.Li and permitting the optically active enantiomorph of DL-PCA.Li to preferentially crystallize from the supersaturated DL-PCA.Li solution in the presence of seed crystals of the optically active enantiomorphs.

DL-PCA can be readily converted into DL-PCA.Li by conventional means. For example, DL-PCA.Li can be formed by reacting DL-PCA with a water soluble lithium compound such as lithium hydroxide of etc. in water.

From the DL-PCA.Li as produced above, the supersaturated solution of DL-PCA.Li can be prepared by any known manners for general preparation of the supersaturated solution, such as by cooling or concentrating a solution obtained by dissolving it by heating in the aqueous solvent such as water, or by the addition of water-soluble organic solvents which reduces the solubility, to the solution.

The process of the present invention can be easily carried out according to any known resolution methods by seeding process, for example, such by adding crystals of the optically active enantiomorph of the lithium salt of PCA(D-or L-PCA.Li) which have been prepared, to the super-saturated solution of DL-PCA.Li and crystallizing selectively the samd optically active enantiomorph as the added seed crystals, or by adding the optically active enantiomorph solution to the super-saturated racemate solution as described above and permitting to naturally crystallize the same active enantiomorph as the optically active enantiomorph of the added solution.

The growth of the crystals can be accomplished by any known means, for example, such by contacting the supersaturated racemate solution under stirring with seed crystals, by contacting the ascending supersaturated racemate solution current with seed crystals, by growing the crystals in the supersaturated solution which both flow in the same direction, in a long tube under the avoidance of the mixture with inverse current, or by growing simultaneously both crystals of the optically active enantiomorphs in the same resolution column, wherein each one is present in particle size ranges which are sufficiently different from each other, so as to be able to fractionate the crystals into the two enantiomorphs by use of this particle size difference.

The crystals of the objective optically active enantiomorph can be obtained by (1) placing the seed crystals in the supersaturated racemate solution, (2) preparing the supersaturated state with respect to the optically active enantiomorph in the solution by conventional means, for example, such by cooling or concentrating the solution, by the addition of common ions to the solution or by joining those means, and (3) growing the seed crystals as described above. In this case, acids, alkaline materials or organic solvents can be added to the supersaturated recemate solution so long as the supersaturated state with respect to the optically active enantiomorph can be maintained.

In carrying out the present invention, it is profitable to keep the resolution temperature 60°C and below because lithium salt of 2-pyrrolidone-5-carboxylic acid (hereinafter abbreviated as PCA.Li) gives the anhydrous salt at the temperature of more than 60°C and gives the dihydrate salt crystals having a more favorable nature at the temperature of less than 60°C.

The crystals of D-or L-PCA.Li precipitated from the solution as described above, can be easily obtained by separation by conventional means of solid-liquid separation, for example, such as filtration, centrifugation and decantation, and then, can be further refined when we wish raise an optical purity of the crude crystals. The crude crystals of the optically active enantiomorphs can be more purified by conventional methods, such by adding the aqueous solvents whose volume can dissolve all the amount of racemate in the crude crystals, to the crude crystals to dissolve selectively the racemate in the solution, using the fact that the supersaturated racemate solution cannot dissolve the optically active enantiomorph, or such by treating the crude crystals with the solution in which the objective optically active enantiomorph has been dissolved.

D-or L-PCA.Li as resolved above can be converted to D-or L-PCA by the known methods, for exaple, by hydrolysis by means of acidic ion-exchange resin or etc.

The resolution process of the present invention can also employed for the purification of the crude products of D-or L-PCA having a low optical purity which contains one of the optically active enantiomorphs more than the other. Namely, in this case, the crystals of the objective optically active enantiomorph whose optical purity is further raised, can be obtained by forming the lithium salt of PCA by reacting these crude products with a basic lithium compound such as lithium hydroxide, and next, precipitating selectively the lithium salt in the supersaturated solution, as fordescribed.

The following examples are further illustrative of the present invention and it will be understood that the invention is not limited thereto.

EXAMPLE 1

A. The production of DL-PCA.Li

A mixture of 900ml water, 1000 grams DL-PCA and 330 grams lithium hydroxide hydrate was dissolved by heating at the temperature of 70°C to 80°C. After the mixture was filtrated, the filtrate was cooled at the temperature of 15° to 20°C, and then, the precipitated crystals were separated by centrifugal filtration. The crystals were washed by a small amount of acetone and dried. The dried crystals weighed 750 grams. The water of crystallization ratio in the crystals by Karl Fischer's Method was 21 percents. The elemental analysis of the product is as follows:

Calculated for $C_5H_6NO_3.Li.2H_2O$, C:35.1%, H:5.89%, N:8.19%, Li: 4.05%.

Found, C:34.9%, H:5.75%, N:8.2%, Li: 4.2% (by neutralization titration after treatment with anion-exchange resin).

These results show that in the obtained crystals a salt of DL-PCA with lithium having a mole ratio of DL-PCA per mole of lithium is formed and it is di-hydrate.

B. The resolution of DL-PCA.Li

A mixture of 100 ml water and 150 grams DL-PCA.LI.2H$_2$O (lithium salt of DL-2-pyrrolidone-5-carboxylic acid di-hydrate) was stirred for 4 hours at 50°C. The surplus crystals were removed by filtration. When the filtrate was cooled to the temperature of 49°C, 40 grams L-PCA.Li.2H$_2$O (lithium salt of L-PCA di-hydrate) were added as seed crystals in the solution, and then the mixture was cooled to the temperature of 44°C under stirring over 50 minutes.

The grown crystals were separated by filtration, washed with a small amount of acetone, and then dried. The dried crystals weighed 17.5 grams. This result shows that the seed crystals grew 4.4 times. The specific rotatory power of these dried crystals was $[\alpha]_D^{20}=-20.5°(C=1.0, PH 8.0)$. These crystals were found to correspond to pure L-PCA.Li.2H$_2$O having an optical purity of 98.7%.

EXAMPLE 2

A mixture of 70 ml water and 100 grams DL-PCA.Li.2H$_2$O was stirred for 4 hours at 50°C. The surplus crystals were removed by filtration. When the filtrate was cooled to the temperature of 49.0°C, 3.0 grams L-PCA.Li.2H$_2$O crystals having a particle size of 20 meshes to 24 meshes were added as seed crystals, and then, when the mixture was cooled to the temperature of 48.0°C, 1 gram D-PCA.Li.2H$_2$O (lithium salt of D-PCA di-hydrate) powder was seeded. And then, the seeded mixture was gradually cooled to the temperature of 30.0°C under stirring.

The grown crystals were separated by filtration by means of suction, washed with a small amount of acetone, and then dried. The dried crystals weighed 25.2 grams. These crystals were screened by means of the 24 meshes screen. 12.5 grams crystals were remained on the screen, and 12.7 grams crystals were passed into the screen. The specific rotatory power of the crystals remained on the screen, was $[\alpha]_D^{20}=-19.9°(C=1, PH 8.0)$, and on the other hand, that of the crystals passed into the screen, was $[\alpha]_D^{20}=+18.80$. These crystals were found to correspond to pure L-PCA.Li.2H$_2$O having an optical purity of 95.7% and D-PCA.Li.2H$_2$O having an optical purity of 90.3%, respectively.

EXAMPLE 3

500 grams DL-PCA.Li.2H$_2$O were dissolved by heating in 380 grams water to be used for the resolution mother liquid. Two glass columns for L-and D-form, having glass filters in the both ends thereof, which both have a diameter of 2 centimeters and a height of 8 centimeters, were connected in a line. 1 gram seed crystals of L-PCA.Li.2H$_2$O and 1 gram seed crystals of D-PCA.Li.2H$_2$O were added to each glass column. To these glass columns, the resolution mother liquid described above was continuously circulated under adjusting the temperature at 50°C. After 4 hours, the circulation of the mother liquid was stopped. Crystals grown in the each glass columns, were taken out, washed with a small amount of acetone, and then dried. The yields and the optical purities of the each dried crystals were as follows:

The dried crystals of L-form weighed 5.6 grams, having an optical purity of 98.0% The specific rotatory power was $[\alpha]_D^{20}=-20.4(C=1.0, PH 8.0)$.

The dried crystals of D-form weighed 5.5 grams, having an optical purity of 98.6%. The specific rotatory power was $[\alpha]_D^{20}=+20.5 (C=1.0, PH 8.0)$.

EXAMPLE FOR REFERENCE

This example for reference explains the refinement process in order to raise further an optical purity of the crystals resolved by the present invention.

To the 100 grams D-PCA.Li.2H$_2$O crystals having an optical purity of 90.5%, the mother liquid for refinement which 12 grams water, which can dissolve 9.5 grams DL-form as an impurity component, was mixed to the 100 ml of D-PCA.Li.2H$_2$O solution supersaturated at 30°C., was added, and stirred for 6 hours at 30°C.

The crystals were separated by filtration by means of suction, washed with a small amount of acetone, and then dried. The dried crystals weighed 89.9 grams. Their specific rotatory power was $[\alpha]_D20=+20.7°(C=1, PH 8.0)$. These crystals were found to correspond to pure D-PCA.Li.2H$_2$0 having an optical purity of 99.5%.

What is claimed is:

1. A process for optically resolving lithium DL-2-pyrrolidone-5-carboxylate into its optically active enantiomorphs, which comprises the step of:

contacting a supersaturated solution of lithium DL-2-pyrrolidone-5-carboxylate with crystals of one or both of the optically active enantiomorphs of said lithium DL-2-pyrrolidone-5-carboxylate with the provision that when seed crystals of both enantiomorphs are used simultaneously they are separable from each other on a particle size basis.

2. A process for optically resolving DL-2-pyrrolidone-5-carboxylic acid, which comprises the steps of:

preparing lithium DL-2-pyrrolidone-5-carboxylate by reacting DL-2-pyrrolidone-5-carboxylic acid with an inorganic lithium base free of other metals, preparing a supersaturated aqueous solution of said lithium DL-2-pyrrolidone-5-carboxylate, contacting said aqueous solution with seed crystals of one or both of the optically active enantimorphs of said lithium DL-2-pyrrolidone-5-carboxylate, resolving one or both of the enantiomorphs by preferential crystallization from said aqueous solution containing said seed crystals, separating the crystals of the resolved enantimorph of said lithium DL-2-pyrrolidone-5-carboxylate from said supersaturated aqueous solution with the provision that when seed crystals of both enantiomorphs are used simultaneously they are separable from each other on a particle size basis,, and converting said separated crystals of an optically active enantiomorph of lithium DL-2-pyrrolidone-5-carboxylate to the free acid form.

* * * * *